Jan. 9, 1968  M. PEVAR  3,363,209

CONTOUR CONFORMABLE MAGNETIC ADAPTER DEVICE

Filed Oct. 20, 1965

INVENTOR.
MAXWELL PEVAR

United States Patent Office 3,363,209
Patented Jan. 9, 1968

3,363,209
CONTOUR CONFORMABLE MAGNETIC
ADAPTER DEVICE
Maxwell Pevar, 8116 Fayette St.,
Philadelphia, Pa. 19150
Filed Oct. 20, 1965, Ser. No. 498,801
8 Claims. (Cl. 335—286)

ABSTRACT OF THE DISCLOSURE

This application discloses a magnetic adapter designed to be interposed between a magnetizing unit and a magnetizable unit and which provides surface conformability to the magnetizable unit or the magnetizing unit, or both, whereby to induce an efficient magnetic flux flow through the adapter between the units.

Background and summary of invention

This invention relates to a contour conformable magnetic adapter device for obtaining maximum magnetic engagement between a magnet and articles of varying surface contour, and has for an object the provision of improvements in this art.

The magnetic adapter disclosed herein may have a great variety of uses but one use which may be mentioned as particularly suited for the use of the present device is for magnetic inspection of the kind disclosed in my Patent No. 3,167,708, granted Jan. 26, 1965.

One of the particular objects of the invention is to provide a magnetic adapter device which will provide maximum contact with objects of various contours for maximum holding engagement therewith and maximum flux flow thereto.

Another object is to provide a magnetic adapter device which is quickly conformable to the contour of an article and will establish efficient flux flow throughout the entire contact area.

Another object is to provide a magnetic adapter device which can be used to transmit mechanical force to an article which is engaged.

Another object is to provide a magnetic adapter device with convenient handling means.

A serious limitation of many magnetic devices now available is that they are designed only for engaging an object of a fixed surface contour, commonly a flat contour; the device disclosed herein is designed to provide full flux flow for any contour of article engaged.

Another object of the invention is to provide a magnetic adapter device which can be combined with like devices to apply extended flux fields to articles in the manner disclosed in my above-mentioned patent.

The above and other objects of the invention, as well as various novel features and advantages, will be apparent from the following description of an exemplary embodiment, reference being made to the accompanying drawings, wherein:

Drawings

Specific description

Figure 1:
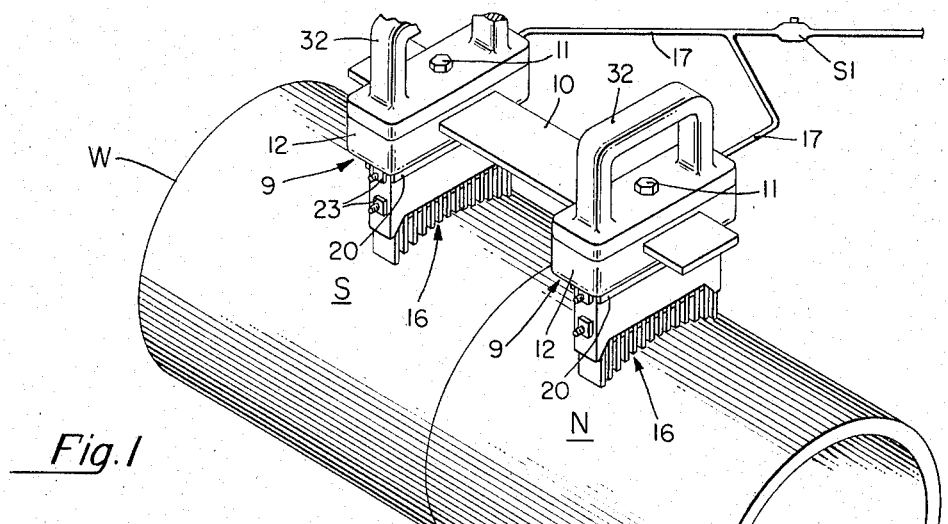
FIG. 1 is an isometric view of a pair of magnetic adapter devices of the present invention applied for inducing an extended flux field in a tubular object.

As shown in FIG. 1, a workpiece or article W, here a pipe of magnetizable material, which may be referred to as a magnetizable unit, is engaged by two magnetic adapter devices and magnetizing units 9 joined by a flux conductive member or bar 10. If desired, means such as set screws 11 or the like, may be used to secure the devices 9 in adjusted positions along the bar member 10.

Each device 9 comprises a magnetic body or magnetizing unit enclosed by a casing 12 and an adapter device comprising a holder 13 with rods 14, 15 carrying a plurality of adapter units 16 for engaging a magnetizable unit and transmitting magnetic flux thereto from a magnetizing unit. The magnet may be either of the permanent type or of the electro-magnetic type, the latter being shown herein with cables 17 supplying suitable current thereto, as under control of a switch S1. For the transmission of flux through an article between devices, one of them will be polarized in one direction and the other in the opposite direction, as indicated by the designations S and N in FIG. 1.

Figure 2:
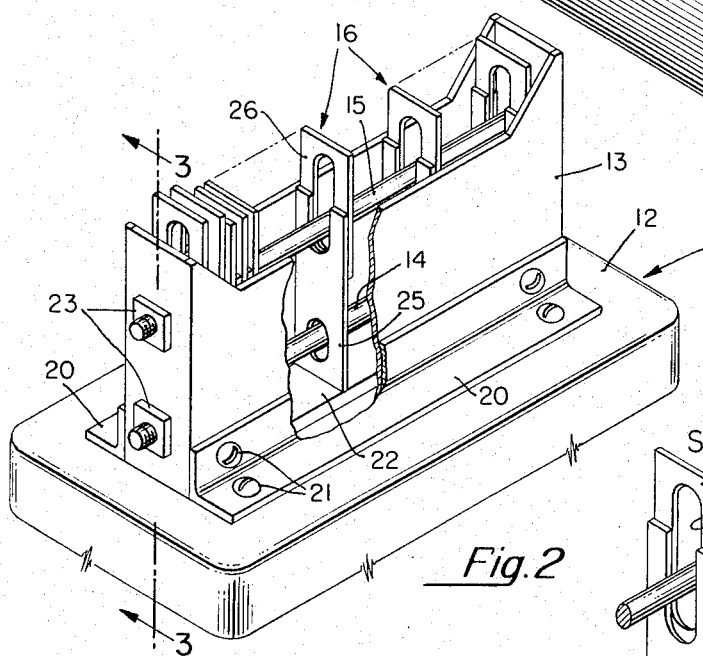
FIG. 2 is an isometric view of the article-engaging end of a single adapter device and an associated magnet with all adapter elements in retracted position.
Figure 3:
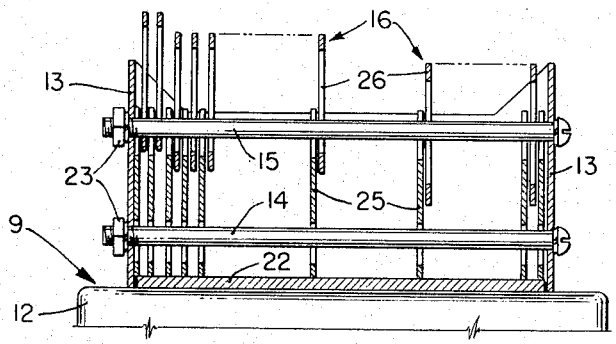
FIG. 3 is a section taken on the line 3—3 of FIG. 2 but with the adapter elements extended.

As shown in FIGS. 2 and 3, the holder 13, in the form illustrated, is firmly secured to the casing 12 of the magnet body, as by angle pieces 20 and screws 21 around the pole piece 22 of the magnet. The rods 14 and 15 are provided with nuts 23 which provide for adjusting clamping pressure on the adapter units 16. If desired for fast change in pressure or for fixedly holding the units in position, as for lifting articles, thumb nuts may be used on one or both ends of the rods, the holder being sufficiently yieldable in its ends to permit of such changes in pressure. It is a feature of the invention that the pole piece may have a fixed end contour, facing the end of the adapter unit here straight, even though the article-engaging elements can readily adjust to and pick up any contour of article within the limits of movement permitted.

Figure 4:
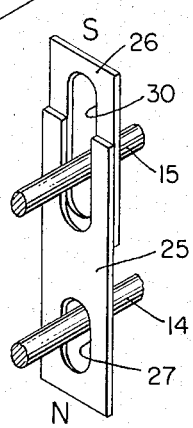
FIG. 4 is an isometric view of a pair of companion adapter elements as shown in FIG. 3.
Figure 5:
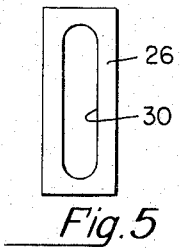
FIG. 5 is a face or elevational view of one of the elements shown in FIG. 4.
Figure 6:
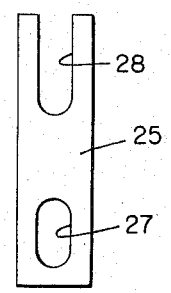
FIG. 6 is a face or elevational view of the other element shown in FIG. 4.

As shown in FIGS. 4, 5 and 6, each adapter unit 16 comprises two companion interengaging flux-conducting normally non-magnetized plates or laminae 25, inner, and 26, outer, which are slidable relative to each other. The inner plates 25 are provided with slots 27 and 28 which loosely embrace the rods 14 and 15, respectively. The outer slot 28 is shown to be open at the outer end but it could be closed across the end. The outer plates 26 are shown to have a single slot 30 embracing the outer rod 15, the sides of the holder 13 retaining and guiding the plate 26 out to its most extended position. It could be arranged to have the rods and plates so shaped and disposed that the upper plates could be guided wholly by slot means embracing both rods.

The arrangement provides that the energized magnet pole piece will attract all of the lower or inner plates 25 and establish broad contact with the flat ends of all such plates at all times while the magnet is energized. The outer plates 26 are held at a sufficient distance above the pole piece as to avoid direct attraction thereto even in their innermost position. Magnetic flux flows through the contacting side areas of plates 25 and 26 and provides magnetic flux in full force to the outer ends of all of the outer plates 26. The outer ends of the inner plates 25 are held at a sufficient distance below the outer ends of the outer plates 26 so as to avoid direct attraction of the inner plates to the magnetizable article or unit even when the outer plates are in their retracted position. The imposed end polarities are indicated by the designations S and N in FIG. 4.

It will be apparent that, within the range of permissible movement between the plates 25 and 26 of the adapter units 16, the outer plates 26 will fit any article curvature, positive or negative, or partly both, being attracted to the article by magnetic force to fit closely, and that full magnetic attraction will be realized at all times no matter what the contour of the article may be. This is much more effective than magnets which have straight line contact with the article if it is curved.

If desired, means may be provided for extending or retracting the outer plate elements 26, although they may be readily pulled out or pushed back by hand if this should be needed or desired.

If tension pull-in springs are not provided, the device may be pushed against a flat surface to push in all of the outer plates 26; and if push-out compression springs are not provided, the device may be held against a flat magnetizable surface and the flux established and the device pulled away to pull out all of the plates 26.

If lift or pull or push is desired, the clamping by the rods which is provided will be adequate for most loads but for heavier loads or for quick pick-up without hand clamping, other suitable load-taking means can be provided, that shown being adequate for illustrating the function.

If full width contact with the object without gaps between the plates is desired, this can readily be provided by widening the outer ends of the outer plates 26 to extend over the outer ends of the inner plates 25; by providing edge contact instead of flat side contact between plates, or otherwise, as will be apparent to those skilled in the mechanical arts.

It will be noted that in FIG. 1 the adapter devices and magnetizing units 9 are shown to have handles 32 for convenient manipulation, the handles not being shown in the views of the other end of the device in the other figures.

While one embodiment of the invention has been illustrated by way of example, it is to be understood that there may be various embodiments and modifications within the general scope of the invention.

I claim:

1. A magnetic adapter device, for use with a magnetizing unit with a pole piece of fixed contour, comprising in combination a plurality of adapter units, holder means for said adapter units, each adapter unit including two overlapping contacting relatively slidable plates, an inner one of said plates being engageable at its inner end with said pole piece and an outer one of said plates being engageable at its outer end with a magnetizable unit, said outer plate being held away from the pole piece at its inner end by a distance sufficient to avoid substantial attraction by said pole piece, and said inner plate being held away from the magnetizable unit at a distance sufficient to avoid substantial attraction to said magnetizable unit.

2. A magnetic adapter device as set forth in claim 1, further characterized by the fact that said inner plates are provided with retaining elements providing limited longitudinal movement between magnetizing and magnetizable units and relative to said outer means on retaining elements provided on said holder plates to accommodate the inner ends of said inner plates to surface contours of the magnetizing unit.

3. A magnetic adapter device as set forth in claim 1, further characterized by the fact that means are provided for varying the side engagement pressure between plates.

4. A magnetic adapter device as set forth in claim 2, further characterized by the fact that means are provided for locking the said outer plates and said inner plates of said adapter units against sliding movement relative to each other and said holding means.

5. A magnetic adapter device as set forth in claim 1, further characterized by the fact that said plates are provided with longitudinal slots embracing retaining rods carried by said holder means and that said rods are provided with clamping means for varying the pressure between said plates.

6. A magnetic adapter device as set forth in claim 1, further characterized by the fact that the device is provided with a casing which at the end opposite said adapter units is formed with an aperture to receive a flux-transmitting bar, and means for clamping said bar in adjusted positions to the end of the pole piece.

7. A magnetic adapter device as set forth in claim 6, further characterized by the fact that said casing is provided with a handle above said aperture.

8. A magnetic adapter device as set forth in claim 1, further characterized by the fact that the device is provided by a casing carrying said magnetizing unit and which, at the end opposite said adapter units, is provided with a handle for manipulating the device.

References Cited

UNITED STATES PATENTS

| 2,405,655 | 8/1946 | Kehoe | 294—65.5 |
| 3,051,875 | 8/1962 | Farwell | 335—285 |

FOREIGN PATENTS

| 238,283 | 9/1911 | Germany. |
| 1,032,441 | 6/1958 | Germany. |

BERNARD A. GILHEANY, *Primary Examiner.*

G. HARRIS, *Assistant Examiner.*